US012157645B2

(12) United States Patent
Liss

(10) Patent No.: US 12,157,645 B2
(45) Date of Patent: Dec. 3, 2024

(54) SYSTEM AND METHOD FOR UNINTERRUPTED FLOW STACKING WITH MOBILE CONVEYORS

(71) Applicant: Jacob Andrew Liss, San Diego, CA (US)

(72) Inventor: Jacob Andrew Liss, San Diego, CA (US)

( * ) Notice: Subject to any disclaimer, the term of this patent is extended or adjusted under 35 U.S.C. 154(b) by 120 days.

(21) Appl. No.: 17/943,976

(22) Filed: Sep. 13, 2022

(65) Prior Publication Data

US 2023/0116800 A1 Apr. 13, 2023

Related U.S. Application Data

(60) Provisional application No. 63/360,065, filed on Sep. 2, 2021.

(51) Int. Cl.

*B65G 65/28* (2006.01)
*B65G 37/00* (2006.01)
*B65G 41/00* (2006.01)

(52) U.S. Cl.

CPC .......... *B65G 65/28* (2013.01); *B65G 37/005* (2013.01); *B65G 41/008* (2013.01)

(58) Field of Classification Search

None

See application file for complete search history.

(56) References Cited

U.S. PATENT DOCUMENTS

| | | | |
|---|---|---|---|
| 1,996,488 A * | 4/1935 | Philips | B65G 65/28 198/588 |
| 4,031,997 A * | 6/1977 | Nelson | B65G 41/008 198/588 |
| 4,646,906 A * | 3/1987 | Wilcox, Jr. | B65G 21/14 198/589 |
| 5,573,363 A * | 11/1996 | Rohr | B63B 35/44 414/138.9 |
| 5,634,545 A * | 6/1997 | Plumley | B65G 37/00 198/303 |
| 6,085,890 A | 7/2000 | Kelly et al. | |
| 6,782,993 B2 | 8/2004 | Bernard et al. | |
| 7,284,650 B2 | 10/2007 | Hoffmann | |
| 8,348,349 B2 * | 1/2013 | Brewka | E21C 47/04 299/18 |
| 8,387,779 B2 * | 3/2013 | Schroder | E21C 41/32 198/508 |
| 8,875,864 B2 | 11/2014 | Emerson et al. | |
| 11,375,738 B2 * | 7/2022 | Zuzga | E02F 5/12 |

* cited by examiner

*Primary Examiner* — Kavel Singh

(74) *Attorney, Agent, or Firm* — Gary L. Eastman, Esq.; Eastman IP

(57) ABSTRACT

A material handling methodology for forming cells of material includes a series of mobile telescoping conveyors feeding a mobile bridge conveyor and mobile radial stacker using a set of mobile bridge transfer conveyors. The method involves transferring material from an infeed point to a cell area in a systematic manner that allows for stacking each cell continuously with no interruption to material flow.

19 Claims, 15 Drawing Sheets

SYSTEM AND METHOD FOR UNINTERRUPTED FLOW STACKING WITH MOBILE CONVEYORS

RELATED APPLICATION

This application claims priority to U.S. Provisional Patent Application Ser. No. 63/360,065 for "A Method for Uninterrupted Flow Stacking with Mobile Conveyors," filed Sep. 2, 2021, and currently the entirety of which is incorporated herein by reference.

FIELD OF THE INVENTION

The present invention relates to bulk material conveying, specifically the components and methods that are used to stack bulk materials such as aggregates, ores, reclaimed ores, waste materials and any other conveyable bulk material.

BACKGROUND OF THE INVENTION

Where storage is required for large amounts of bulk material, various methods exist in the prior art to place said material over areas of arbitrary size in a process known as stacking. A stack of arbitrary area and constant height is constructed from smaller volumes known as cells. Cells are created by moving the terminal discharge point of a material handling system along a continuous path over time. Stacking is achieved by combining two or more cells.

The economic viability of a particular stacking system is driven by the operational efficiency of the system's conveyor arrangement. Efficiency of the system is driven by the amount of operational down time—where material is not flowing—caused by the rearrangement required in the system to continue creating a cell or to move to start a new cell. Various methods exist in the prior art to minimize the amount and duration of material flow interruption during the stacking process.

SUMMARY OF THE INVENTION

Provided is a material handling system that offers a method for stacking wherein there is no interruption to material flow during the creation of a cell and no material spillage is created. The preferred embodiment of the present invention utilizes a mobile radial stacker conveyor, mobile bridge conveyor, two (2) mobile bridge transfer conveyors, and a minimum of two (2) articulating mobile conveyors, all of which are self-propelled via slewing crawler tracks. Each articulating mobile conveyor is equipped with a discharge chute that can feed one of two downstream conveyors—another articulating mobile conveyor (primary feed) or a bridge transfer conveyor (transfer feed).

By using two mobile bridge transfer conveyors, material flow can be diverted from the first mobile bridge transfer conveyor to the second mobile bridge transfer conveyor while repositioning the first mobile bridge transfer conveyor. When the first mobile bridge transfer conveyor is repositioned, material flow can be directed through it again, allowing the second mobile bridge transfer conveyor to be moved. This allows for material flow to continue uninterrupted during stacking of the entirety of the cell, even as articulating mobile conveyors are removed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
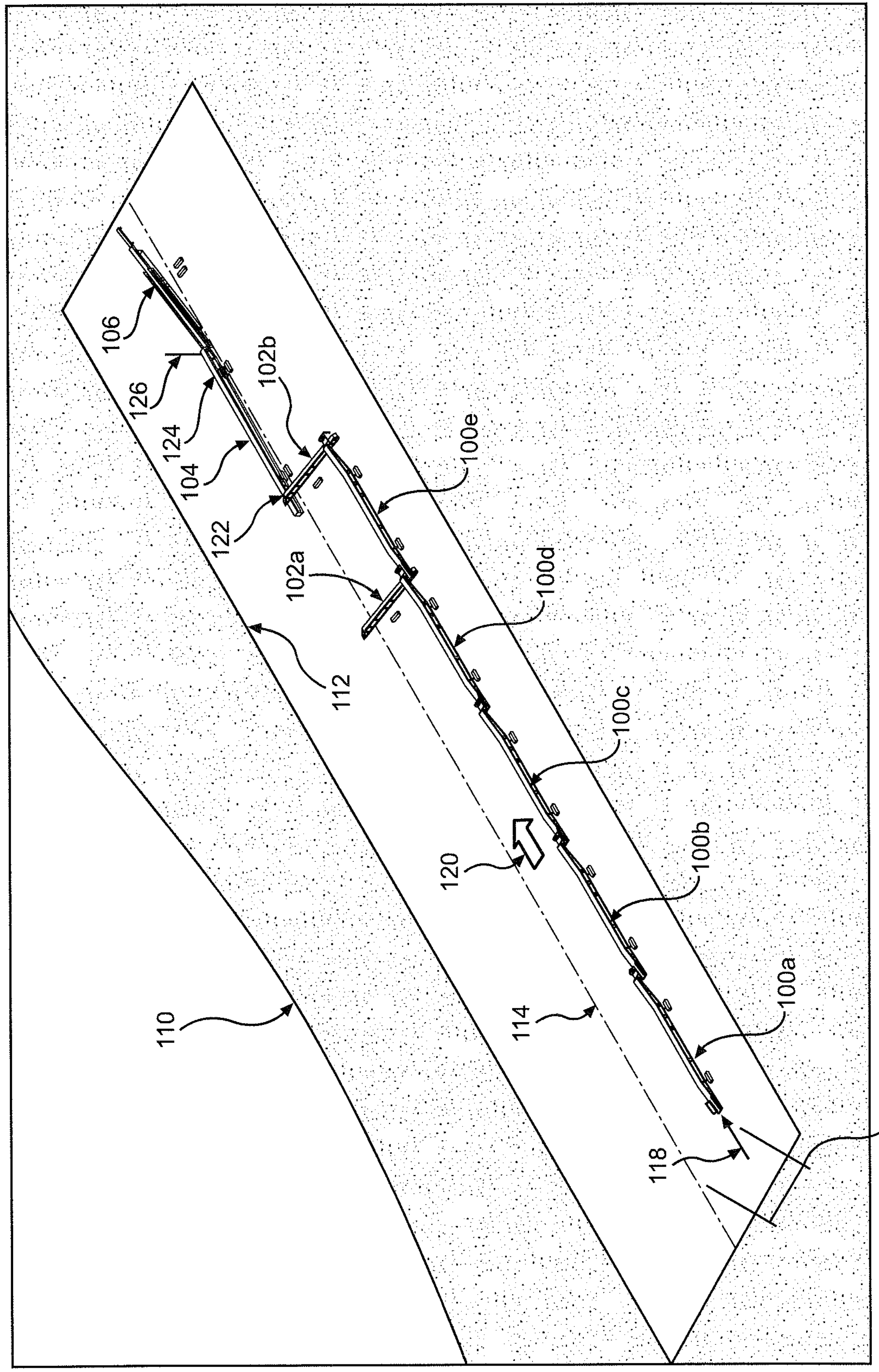
FIG. 1 is a perspective view of the preferred embodiment positioned to initiate the stacking of the first segment of the first cell.

In FIG. 1 the preferred embodiment is shown in a stacking area 110 to initiate the stacking of a cell in a cell area 112 along a centerline 114. This arrangement contemplates a set of mobile telescoping conveyors 100*a*, 100*b*, 100*c*, 100*d*, 100*e* that are aligned parallel to the centerline 114 and offset by a length 116 defined by the geometry of the mobile bridge transfer conveyors 102*a*, 102*b*. Each mobile telescoping conveyor 100 is capable of discharging material to two points that may be occupied by other mobile conveyors such as a bridge transfer conveyor 102 or another articulating conveyor 100 as contemplated in the preferred embodiment. Initially, material flows from the system infeed point 118 via all telescoping conveyors 100 in the direction noted by flow arrow 120 to the bridge transfer conveyor 102*b* which feeds the mobile bridge conveyor 104. The bridge conveyor 104 may be fed at any point between the aft load limit area 122 and the fore load limit area 124. In the initial configuration in the bridge conveyor 104 is fed at the aft load limit area 122 via the active bridge transfer conveyor 102*b*. The material subsequently feeds the radial stacker conveyor 106 which in the preferred embodiment is affixed to the bridge conveyor 104 via a pinned connection with axis 126 at the material transfer point. The second bridge transfer conveyor 102*b* is positioned at the head end of the penultimate telescoping conveyor 100*d*, parallel to the first bridge transfer conveyor 102*a*.

Figure 2:
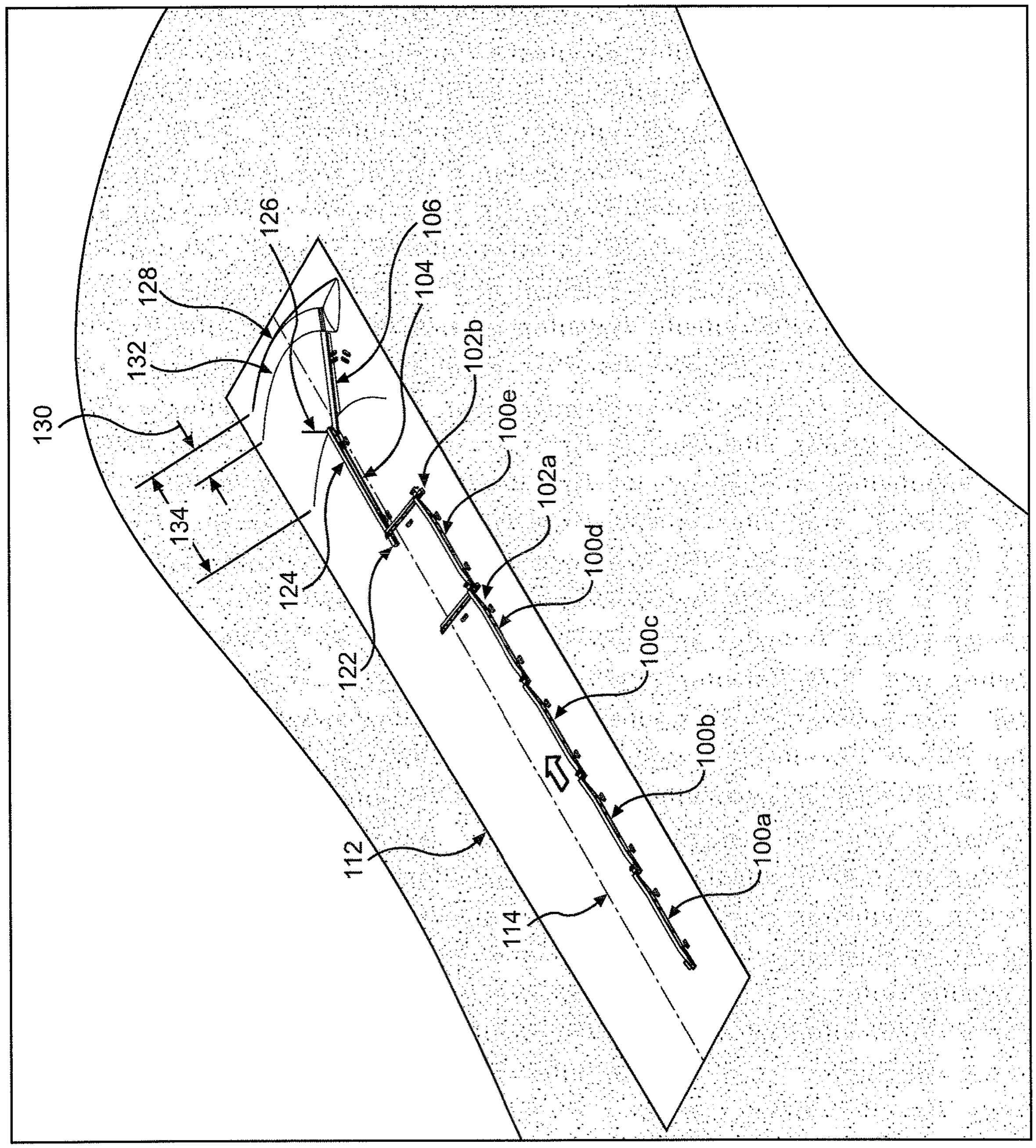
FIG. 2 is a perspective view of the preferred embodiment initiating the stacking of the first segment of the first cell.

For the preferred embodiment, as shown in FIG. 2, the stacking of the cell area 112 begins with the radial stacker conveyor 106 depositing an arc of material 128 as it rotates about a pinned connection with axis 126. Upon completion of an arc 128 the radial stacker 106 and mobile bridge conveyor 104 retreat a distance 130 along the cell centerline 114 and create a subsequent arc 132. Upon completion of a certain quantity of material arcs such that the radial stacker conveyor 106 has retreated a distance 134, the fore load limit area 124 of the bridge conveyor 104 will reach the transfer point of the active bridge transfer conveyor 102*b*. Simultaneously, the aft load limit area 122 of the bridge conveyor 104 will align with the discharge of the inactive bridge transfer conveyor 102*a*. Throughout this phase of operation all mobile conveyors 100*a*, 100*b*, 100*c*, 100*d*, 100*e*, 102*a*, 102*b* remain stationary with the exception of the bridge conveyor 104 and the stacker conveyor 106.

Figure 3:
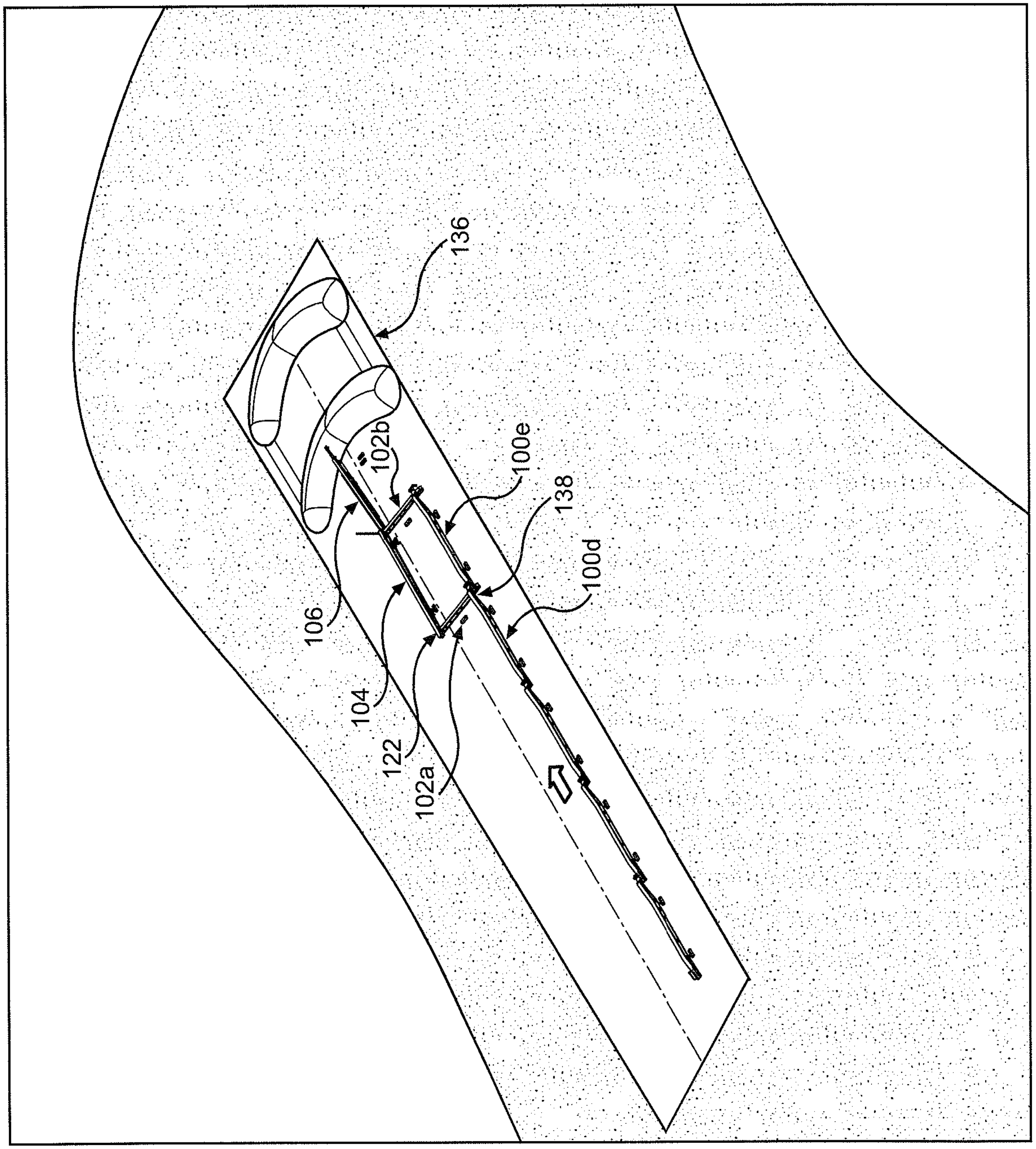
FIG. 3 is a perspective view of the preferred embodiment having completed the stacking of the first segment of the first cell.

FIG. 3 shows the preferred embodiment upon completion of the first cell segment 136. The material flow is now diverted at the head end 138 of the penultimate telescoping conveyor 100*d*. Diverting the discharge of telescoping conveyor 100*d* has the effect of changing the material flow from the final telescoping conveyor 100*e* to the inactive bridge transfer conveyor 102*a*, such that it is now the active bridge transfer conveyor and bridge transfer conveyor 102*b* is now inactive. Material flow now reaches the bridge conveyor 104 at the maximum aft loading area 122.

Figure 4:
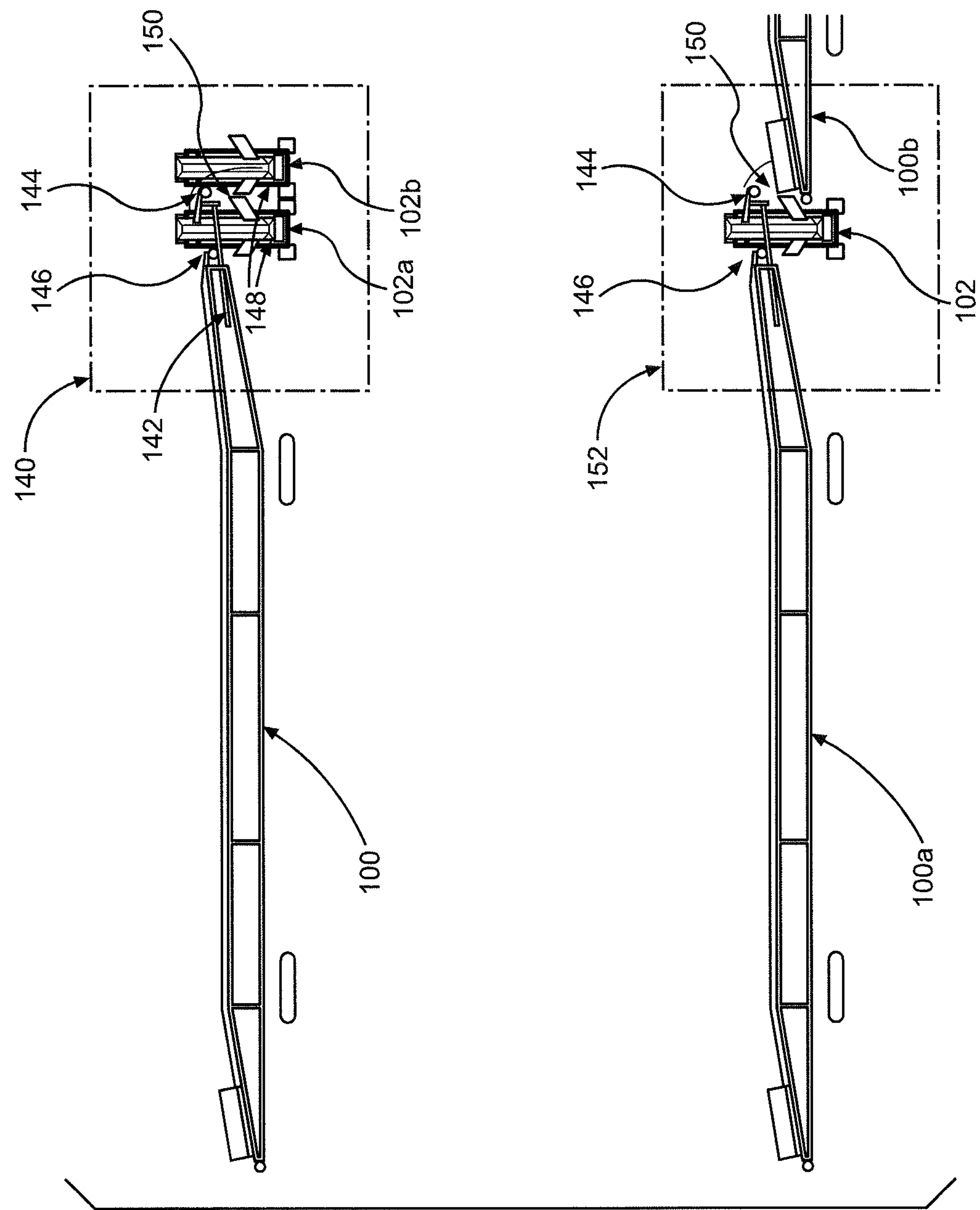
FIG. 4 is an elevation view of the mobile telescoping conveyor arrangements contemplated by the preferred embodiment.

FIG. 4 shows elevation views of the discharge configurations contemplated for the mobile telescoping conveyors 100 of the preferred embodiment. Contemplated in one arrangement 140 is a push button activated hydraulic ram 142 which extends 144 and retracts 146 the material loading point 148 between the bridge transfer conveyors 102*a*, 102*b*, with a spillage guard 150. The preferred embodiment also contemplates a second arrangement 152 such that the retracted discharge 146 of the telescoping conveyor 100*a* feeds a bridge transfer conveyor 102 and the extended discharge 144 feeds another telescoping conveyor 100*b*.

Figure 5:
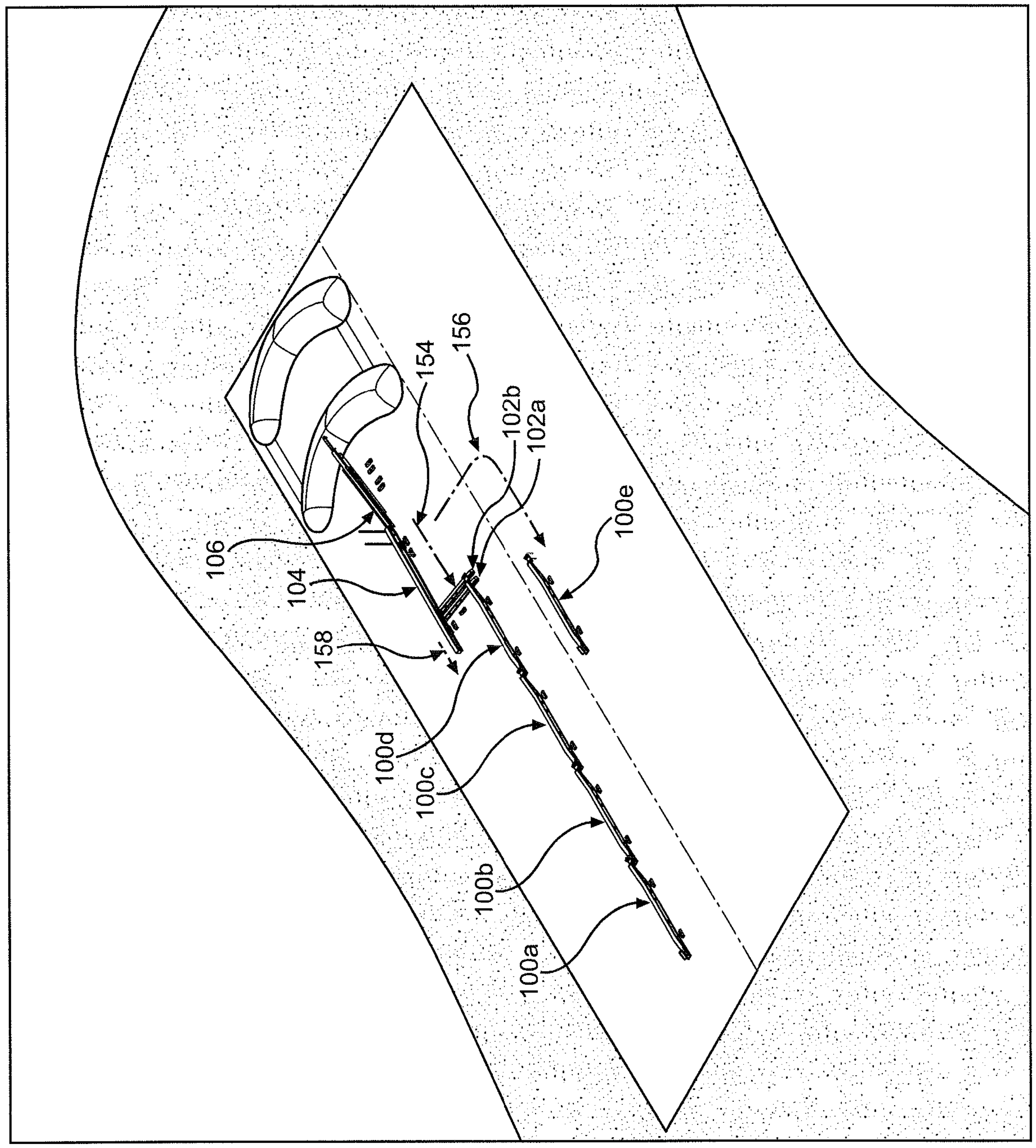
FIG. 5 is a perspective view of the preferred embodiment during the first bridge transfer conveyor relocation.

FIG. 5 shows a perspective view of the first bridge transfer maneuver, which occurs after bridge transfer conveyor 102*b* and telescoping conveyor 100*e* were deactivated by retracting the telescoping discharge of telescoping conveyor 100*d*. Bridge transfer conveyor 102*b* and telescoping conveyor 100*e* are moved as noted with path lines 154, 156. During this operation the bridge conveyor 104 and stacker conveyor 106 continue to stack material and retreat as noted by path line 158, fed by bridge transfer conveyor 102*a* and the remaining telescoping conveyors 100*a*, 100*b*, 100*c*, 100*d*. When the repositioned bridge transfer conveyor 102*b* is in position next to the active bridge transfer conveyor 102*a* the system is ready for the second bridge transfer maneuver.

Figure 6:
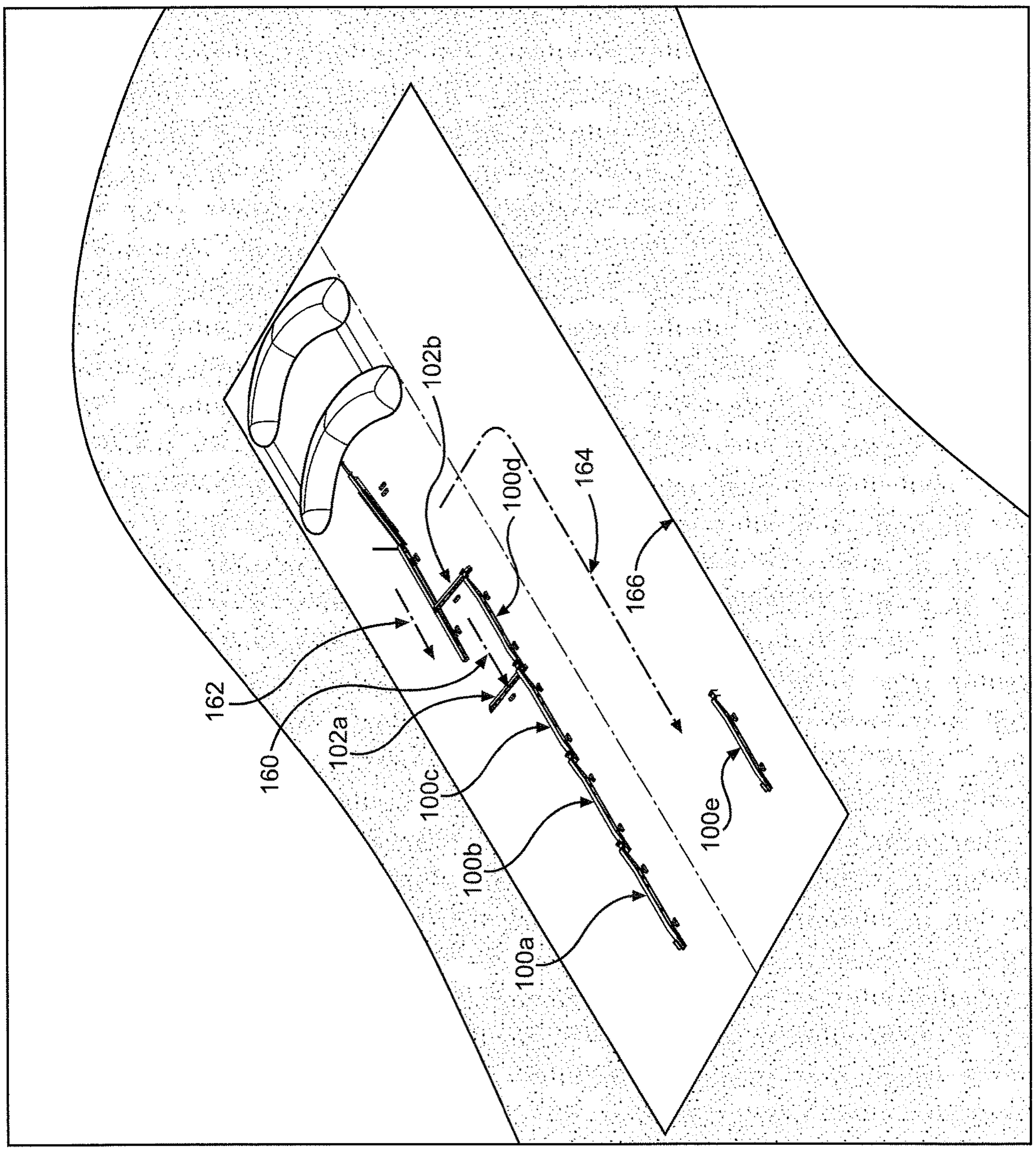
FIG. 6 is a perspective view of the preferred embodiment during the second bridge transfer conveyor relocation.

FIG. 6 shows a perspective view of the second bridge transfer maneuver, in which bridge transfer conveyor 102*a* is repositioned. Prior to moving bridge transfer conveyor 102*a* it must be deactivated, which is accomplished by extending the telescoping conveyor 100*d* to feed the newly repositioned bridge transfer conveyor 102*b*. With flow now diverted, bridge transfer conveyor 102*a* moves as noted by the path line 160 to the next required position. During this operation the bridge conveyor 104 and stacker conveyor 106 continue to stack material and retreat as noted by the path line 162, fed by bridge transfer conveyor 102*b* and the telescoping conveyors 100*a*, 100*b*, 100*c*, 100*d*. Telescoping conveyor 100*e* has completed transit via the noted path 164 and is positioned in the second cell area 166.

Figure 7:
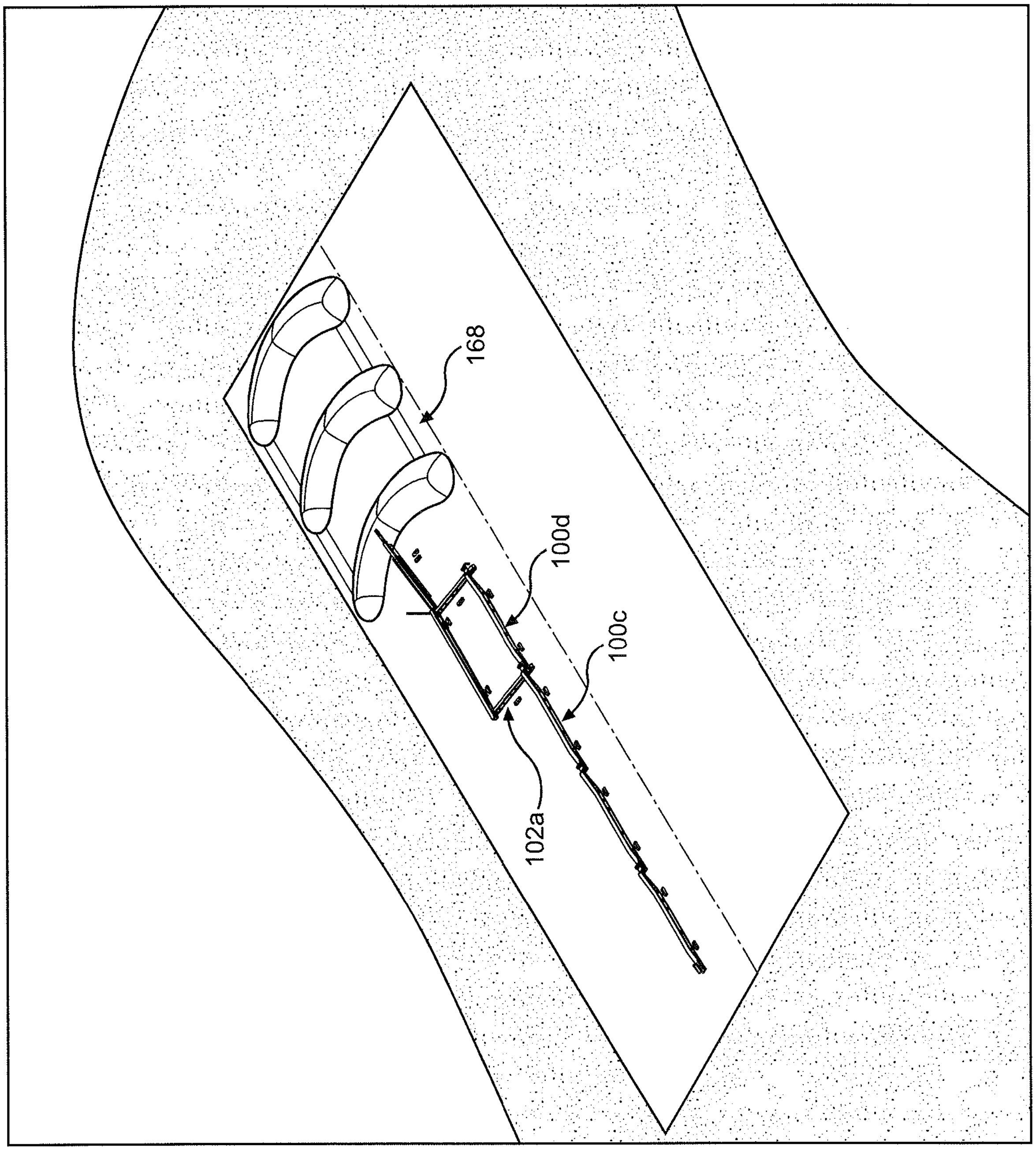
FIG. 7 is a perspective view of the preferred embodiment upon the completion of the second segment of the first cell.

FIG. 7 shows a perspective view of the preferred embodiment having completed the stacking of the second cell segment 168. The system is in position for the diversion of the material flow from telescoping conveyor 100*d* to bridge transfer conveyor 102*a* at the head end of telescoping conveyor 100*c*. From this point forward additional cell segments are created using an identical sequence of flow changes and mobile conveyor movements.

Figure 8:
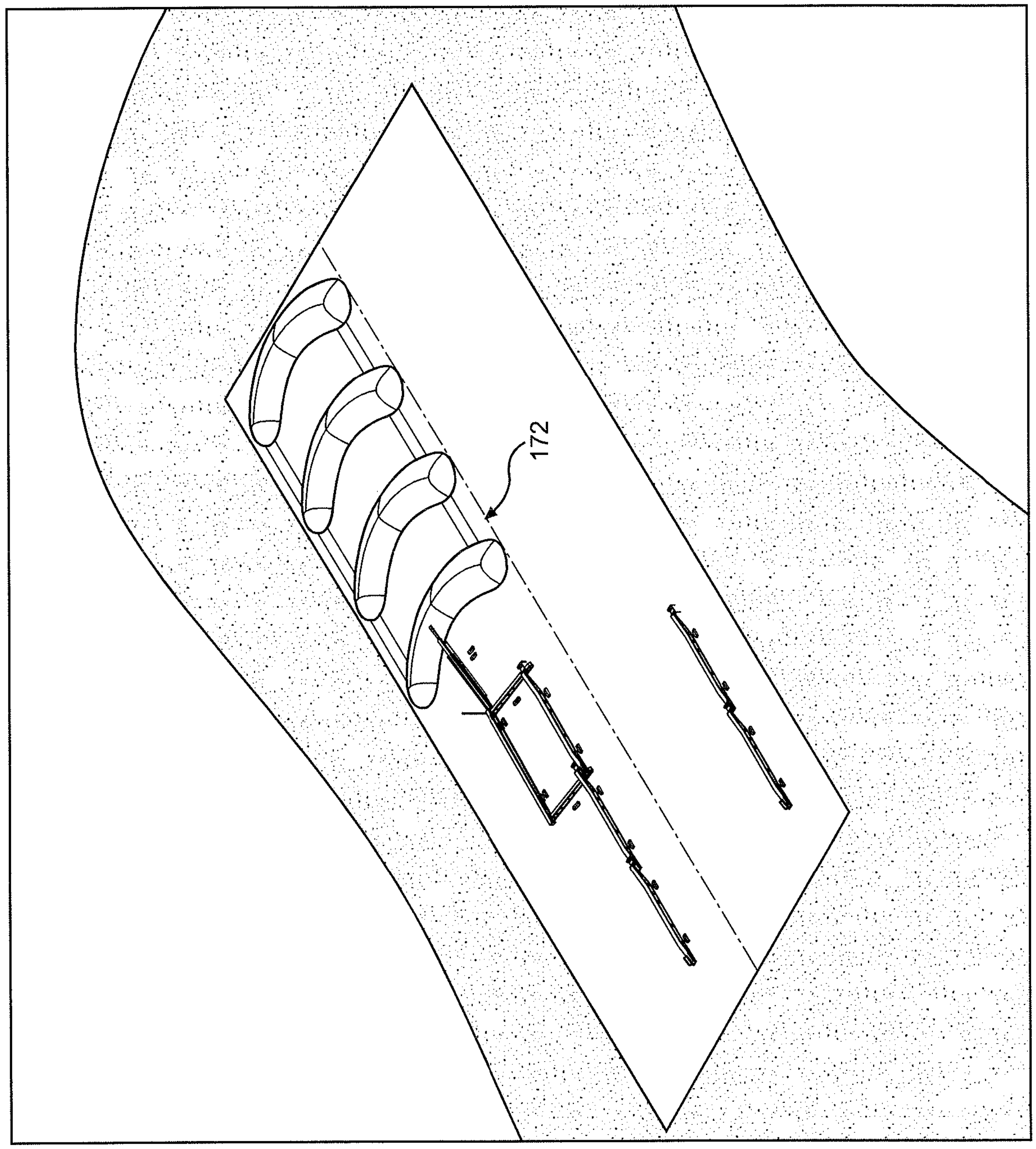
FIG. 8 is a perspective view of the preferred embodiment upon the completion of the third segment of the first cell.

FIG. 8 shows a perspective view of the preferred embodiment having completed the stacking of the third cell segment 172.

Figure 9:
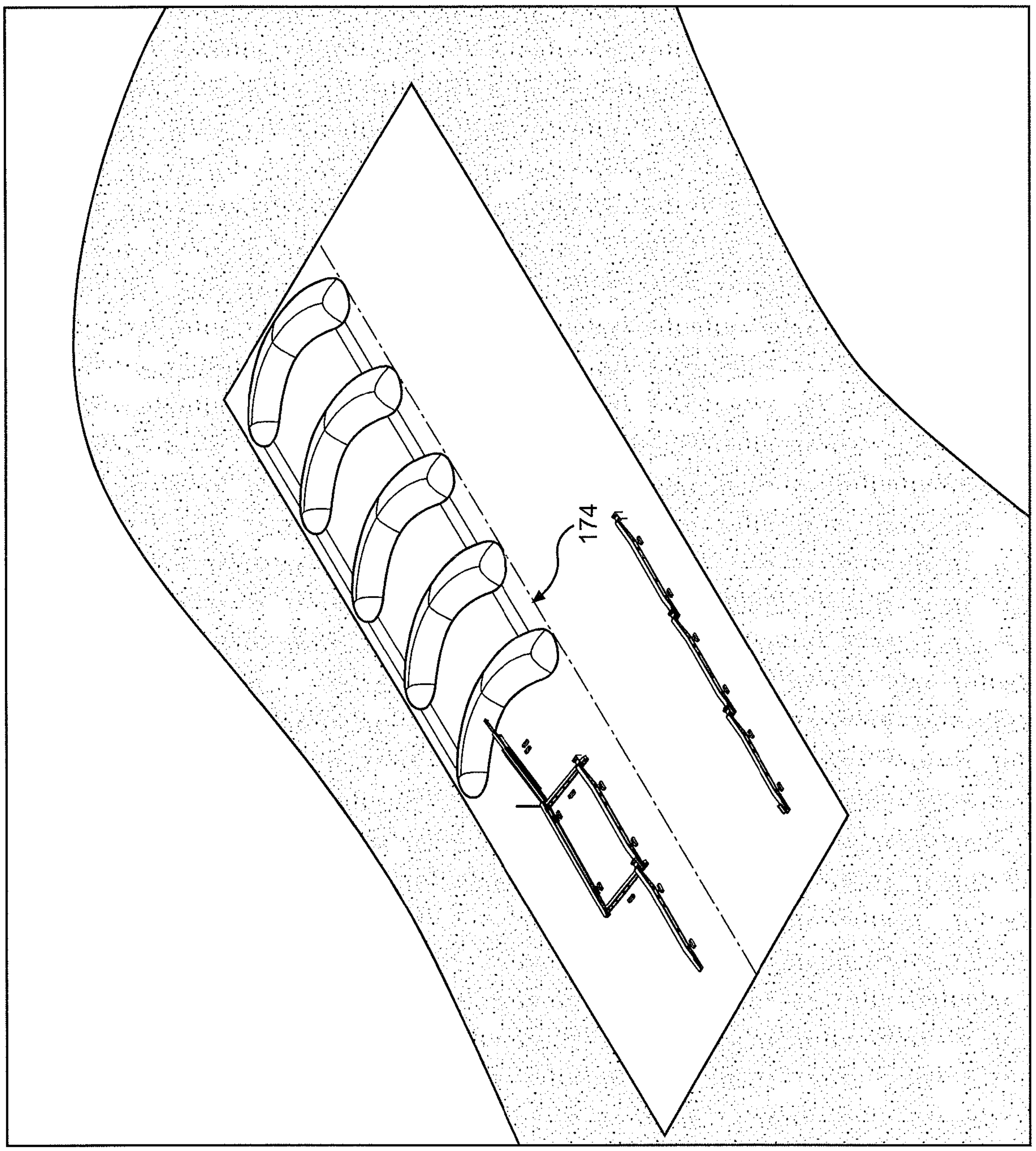
FIG. 9 is a perspective view of the preferred embodiment upon the completion of the fourth segment of the first cell.

FIG. 9 shows a perspective view of the preferred embodiment having completed the stacking of the fourth cell segment 174.

Figure 10:
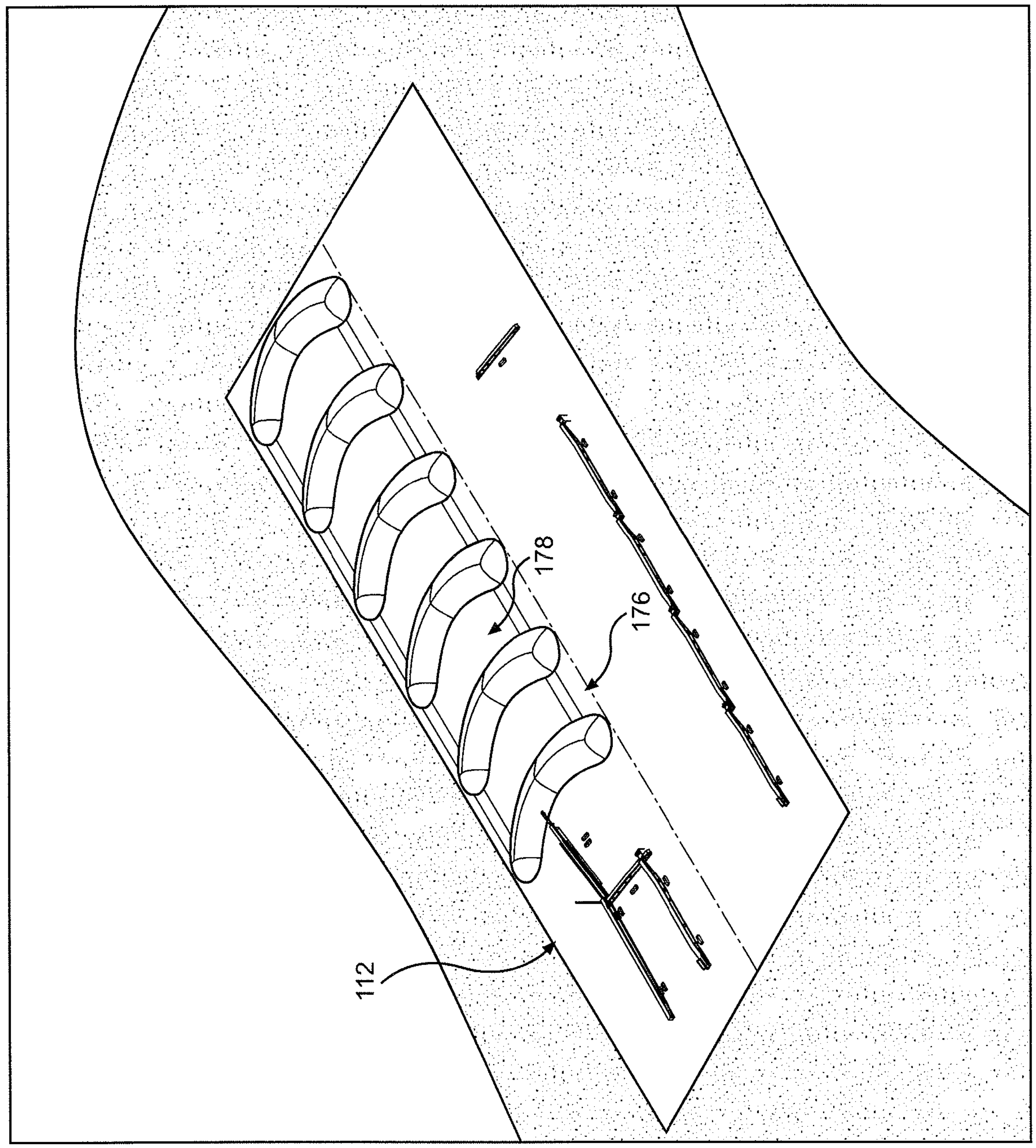
FIG. 10 is a perspective view of the preferred embodiment upon the completion of the fifth and final segment of the first cell.

FIG. 10 shows a perspective view of the preferred embodiment having completed the stacking of the fifth cell segment 176 which completes the stacking of the cell 178 for this cell area 112. As illustrated, when enough cell segments are stacked so that only a single mobile telescoping conveyor 100*a* remains in the first cell area 112, mobile bridge transfer conveyor 102*a* is positioned in the second cell area 166 in preparation for commencing stacking of another cell.

Figure 11:
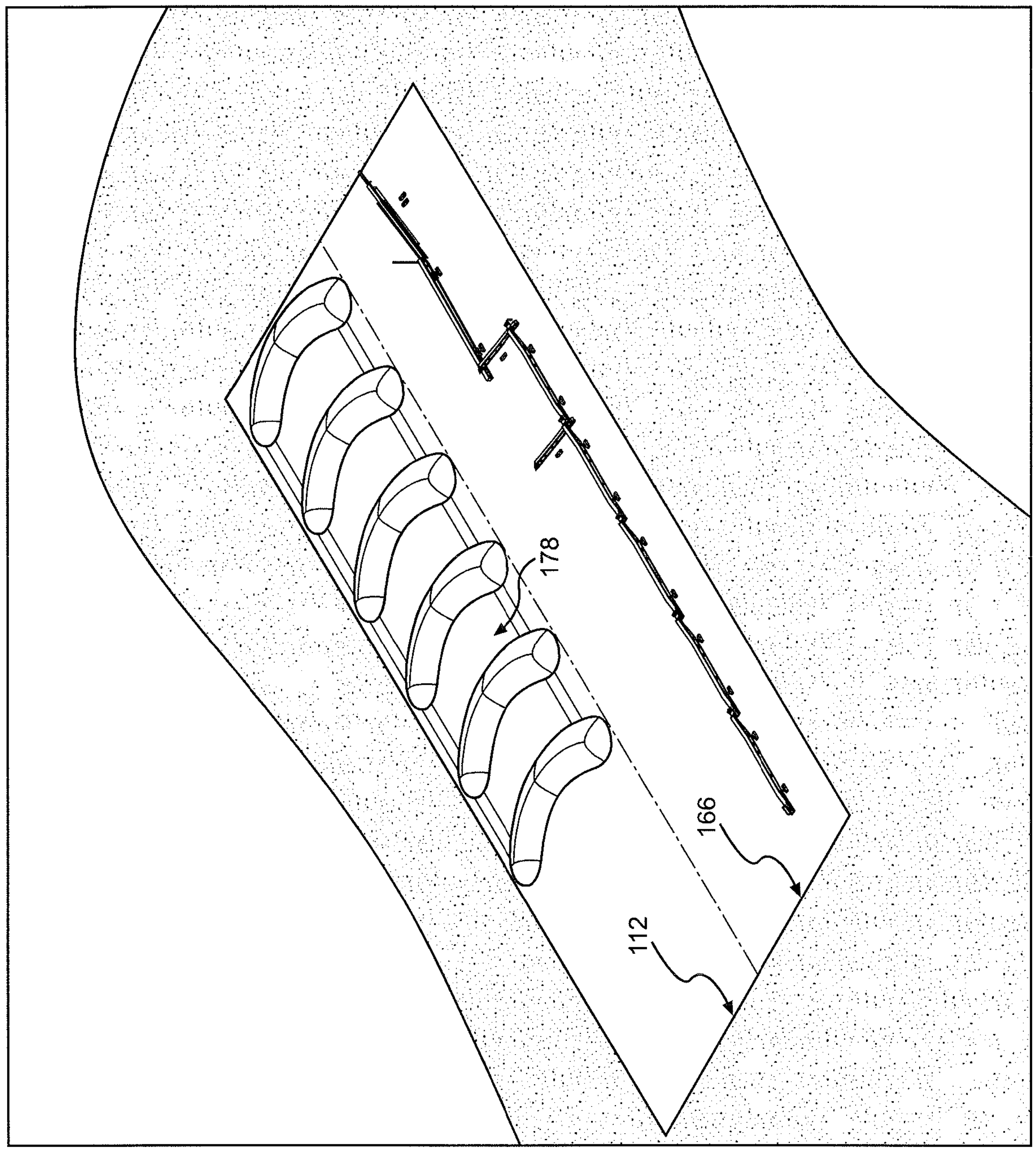
FIG. 11 is a perspective view of the preferred embodiment in position to commence stacking of the second cell.

FIG. 11 shows a perspective view of the preferred embodiment in position to commence stacking a cell in the second cell area 166, having completed stacking the cell 178 in the first cell area 112. Mobile bridge transfer conveyor 102*b*, bridge conveyor 104, and radial stacker conveyor 106 are positioned in the second cell area 166 in order to repeat the process to stack another cell. As illustrated, in a preferred embodiment mobile bridge transfer conveyor 102*a* is positioned at the head of the last telescoping conveyor 100 while mobile bridge transfer conveyor 102*b* is positioned at the head of the penultimate telescoping conveyor 100 in the second cell area 166.

Figure 12:
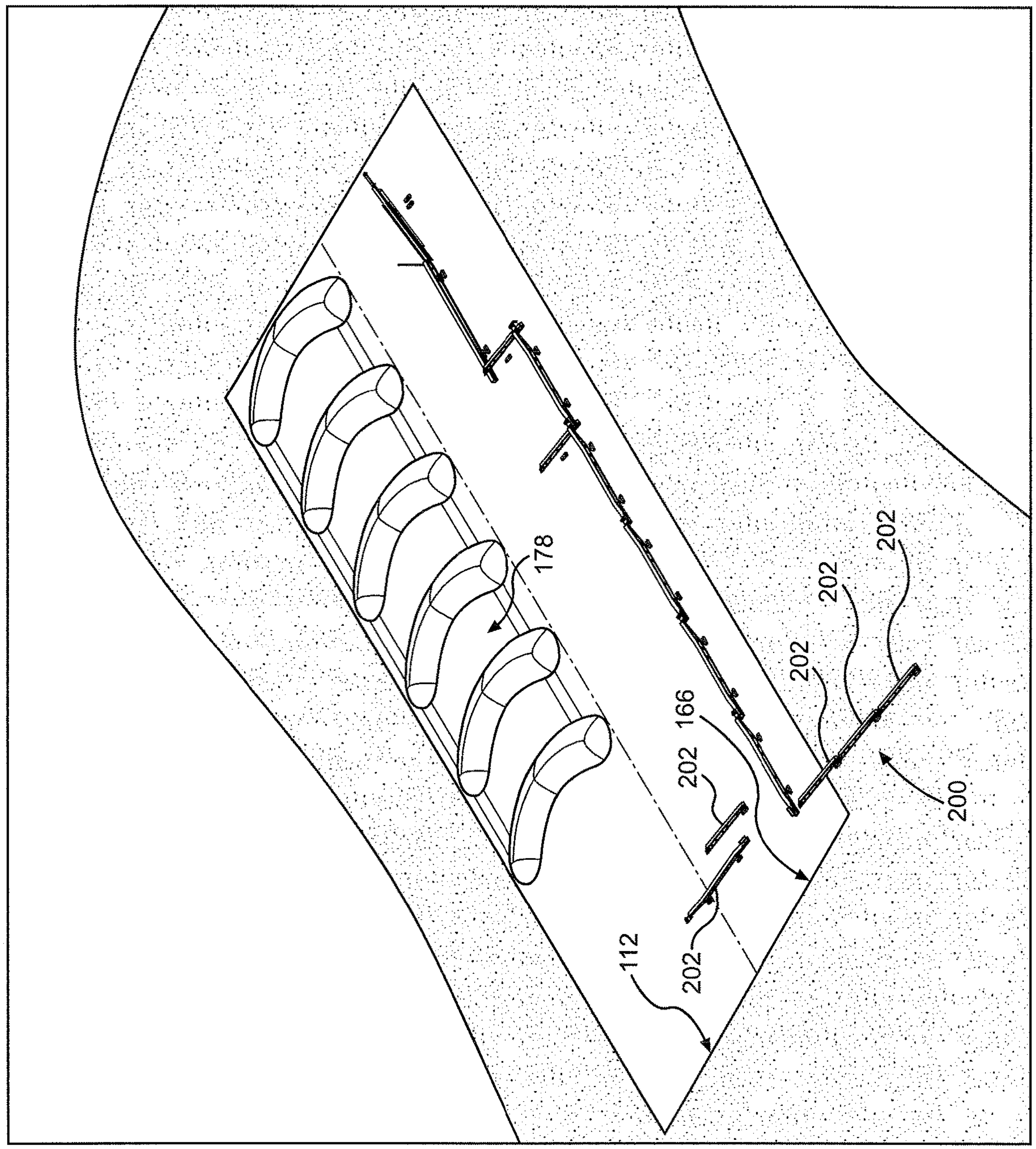
FIG. 12 is a perspective view of the preferred embodiment in position to commence stacking of the second cell, illustrating a preferred embodiment of the system infeed provided by another mobile conveying system.

Referring now to FIG. 12, in a preferred embodiment system infeed 200 is provided by another mobile conveying system made up of conveyors 202. In an exemplary embodiment, conveyors 202 are added or removed from system 200 as needed in order to commence stacking in a new cell from any arbitrary infeed location.

Figure 13:
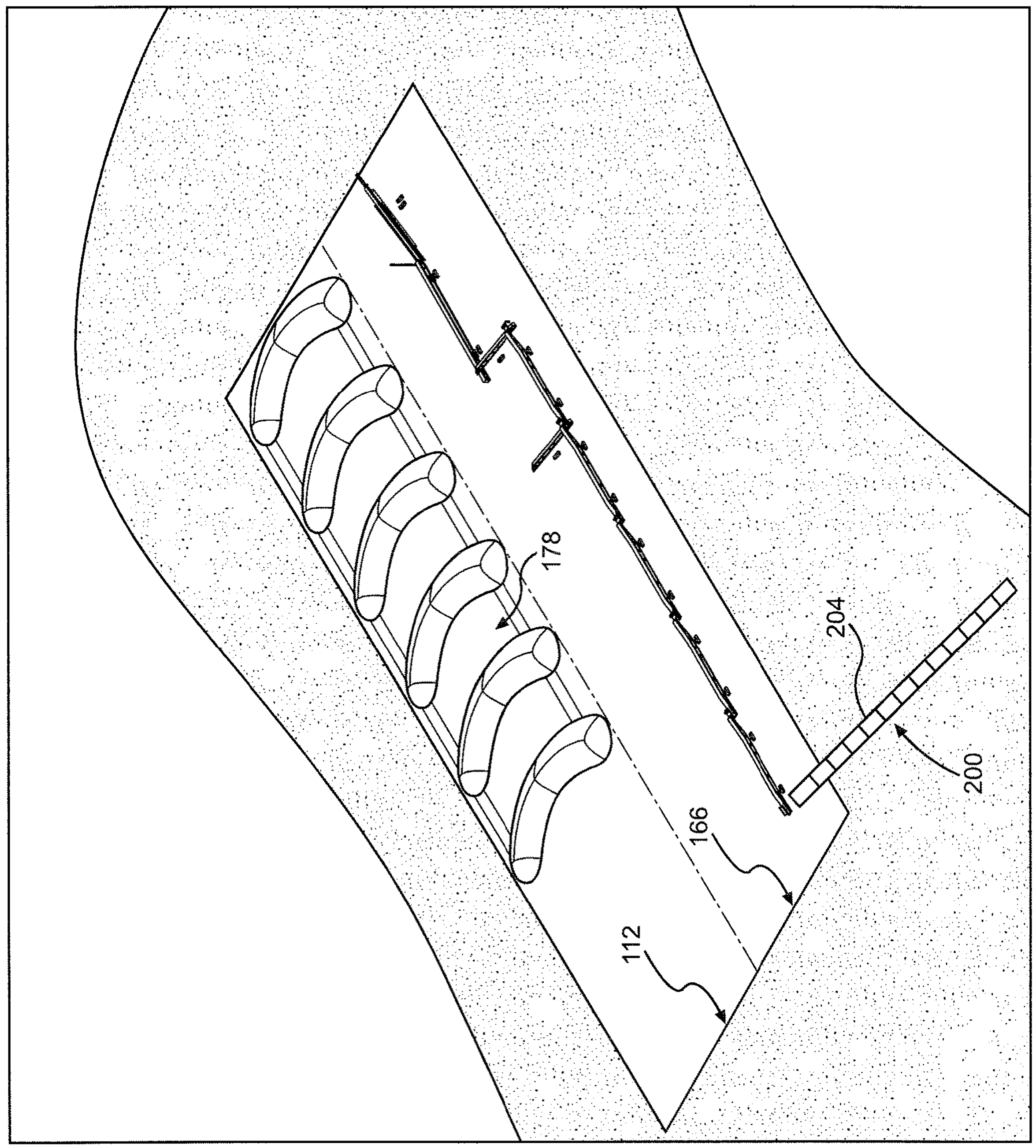
FIG. 13 is a perspective view of the preferred embodiment in position to commence stacking of the second cell, illustrating an alternate preferred embodiment of the system infeed provided by a tripper conveyor.

Referring now to FIG. 13, in alternate embodiments system infeed 200 is provided by another infeed system, such as a tripper conveyor 204 operating on a fixed overland conveyor (not illustrated in FIG. 13). Either a fixed tripper conveyor or a mobile tripper conveyor can be used as desired and according to site requirements.

Figure 14:
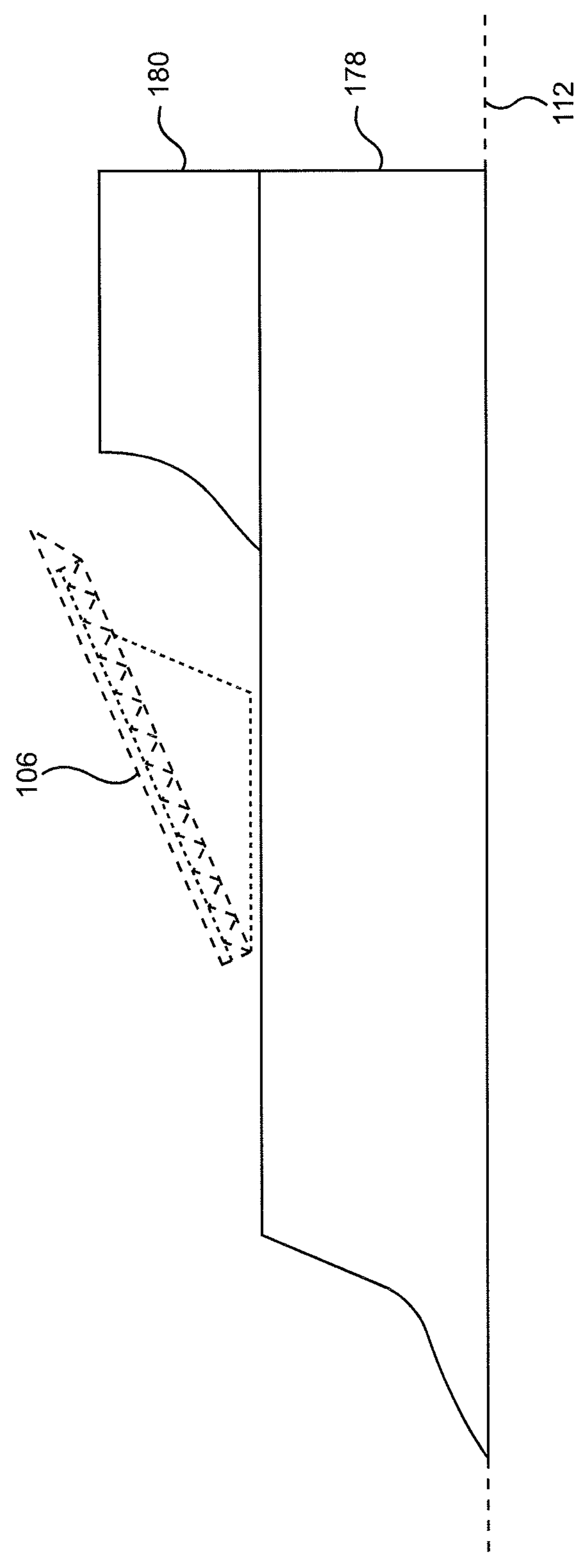
FIG. 14 is a side view of a cell forming a substrate for a cell above it.

Referring now to FIG. 14, in some embodiments, a completed cell 178 is used as a substrate for a cell 180 or more than one cell 180 above it.

Figure 15:
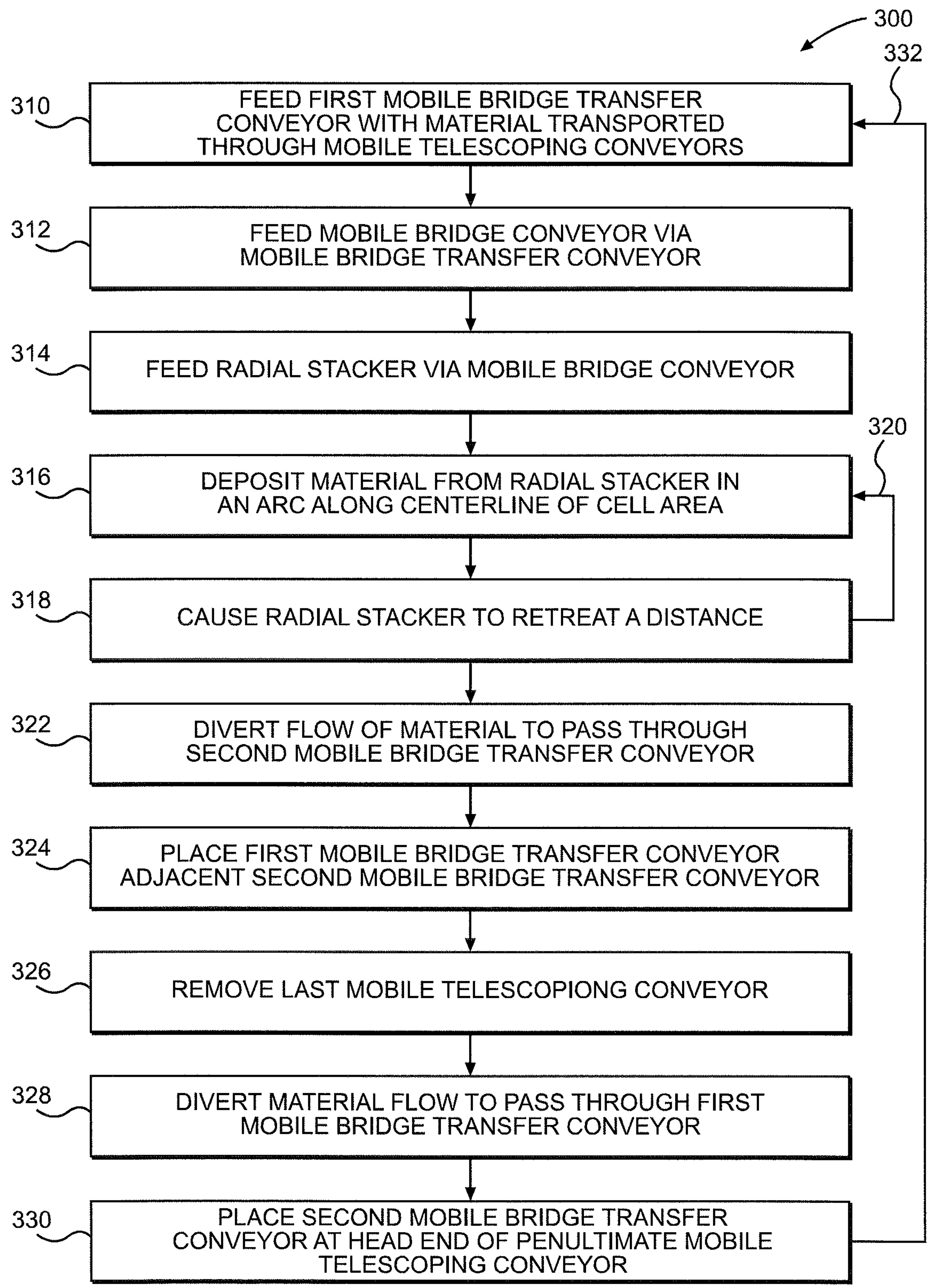
FIG. 15 is a flowchart illustrating a preferred embodiment of a method for uninterrupted flow stacking with mobile conveyors.

Referring now to FIG. 15, a preferred embodiment of a method for uninterrupted flow stacking with mobile conveyors is illustrated and generally designated 300. Method 300 operates via an uninterrupted flow stacking system with mobile conveyors such as the embodiment of a flow stacking system illustrated in FIGS. 1-13, and includes steps 310, 312, and 314 of feeding material to be stacked. More particularly, in step 310, material is fed through the mobile telescoping conveyors 100 to mobile bridge transfer conveyor 102*b*, or, during a bridge transfer maneuver, mobile bridge transfer conveyor 102*a* (see FIGS. 1-3). In step 312, the material is transferred through mobile bridge transfer conveyor 102*b* or mobile bridge transfer conveyor 102*a* to mobile bridge conveyor 104. In step 314, the material is transferred through mobile bridge conveyor 104 to radial stacker conveyor 106, which deposits the material in an arc along centerline 114 of cell area 112. Steps 310, 312, 314, and 316 are performed continuously throughout method 300, since method 300 enables uninterrupted flow stacking.

Radial stacker conveyor 106 deposits material in step 316 and retreats a distance in step 318 once an arc is completed in order to continue depositing material in a subsequent arc. Steps 316 and 318 are performed continuously by the radial stacker conveyor 106 throughout method 300 as indicated by loop path 320.

When the radial stacker conveyor 106 has retreated sufficiently that the aft load limit area of mobile bridge conveyor 104 aligns with mobile bridge transfer conveyor 102*a*, step 322 is performed in which the flow of material is diverted so that it passes through mobile bridge transfer conveyor 102*a* rather than mobile bridge transfer conveyor 102*b* in order to feed mobile bridge conveyor 104 and radial stacker conveyor 106. Once step 322 is performed, the system is ready for the first bridge transfer maneuver, which involves steps 324 and 326. In step 324, the deactivated mobile bridge transfer conveyor 102*b* is moved and placed adjacent the active mobile bridge transfer conveyor 102*a*. In step 326, the last mobile telescoping conveyor 100 is removed; in this step, the removed mobile telescoping conveyor 100 is generally positioned in another cell area in preparation for stacking another cell once stacking of the current cell is completed.

After the first bridge transfer maneuver is completed, step 328 is performed in preparation for the second bridge transfer maneuver. In step 328, mobile bridge transfer conveyor 102*b* once again becomes the active mobile bridge transfer conveyor: Material flow is diverted to pass through mobile bridge transfer conveyor 102*b* rather than mobile bridge transfer conveyor 102*a* in order to feed mobile bridge conveyor 104 and radial stacker conveyor 106. The second bridge transfer maneuver is then performed as illustrated by step 330 of placing the second mobile bridge transfer conveyor 102*a* at the head of the penultimate mobile telescoping conveyor 100 (which was the antepenultimate mobile telescoping conveyor prior to removal of a mobile telescoping conveyor in step 326).

As indicated by loop path 332, the steps of method 300 are repeated until a cell 178 (see FIG. 10) is completely stacked.

While there have been shown what are presently considered to be preferred embodiments of the present invention, it will be apparent to those skilled in the art that various changes and modifications can be made herein without departing from the scope and spirit of the invention.

What is claimed is:

1. A system for uninterrupted flow stacking, comprising:

a first cell area;

a mobile radial stacker;

a mobile bridge conveyor having a fore load limit area and an aft load limit area;

a plurality of mobile telescoping conveyors, each having a head end;

a first mobile bridge transfer conveyor having a flow output end;

a second mobile bridge transfer conveyor having a flow output end;

a first discharge configuration in which the first mobile bridge transfer conveyor is active and the second mobile bridge transfer conveyor is inactive; and a second discharge configuration in which the first mobile bridge transfer conveyor is inactive and the second mobile bridge transfer conveyor is active, wherein the active mobile bridge transfer conveyor is positioned such that material for stacking is conveyed to the mobile bridge conveyor between the fore load limit area and the aft load limit area, wherein the system is configured such that the material for stacking is conveyed through the plurality of mobile telescoping conveyors to the active mobile bridge transfer conveyor, wherein the system is configured to alternate between the first discharge configuration and the second discharge configuration without interruption to flow of the material for stacking, and wherein the system is configured for a first bridge transfer maneuver in which the system is changed from the first discharge configuration to the second discharge configuration, the first mobile bridge transfer conveyor is moved to a position adjacent to the second mobile bridge transfer conveyor, and a last mobile telescoping conveyor of the plurality of mobile telescoping conveyors is removed becoming a removed mobile telescoping conveyor, resulting in a penultimate mobile telescoping conveyor of the plurality of mobile telescoping conveyors becoming a new last telescoping conveyor and an antepenultimate mobile telescoping conveyer of the plurality of mobile telescoping conveyors becoming a new penultimate mobile telescoping conveyor.

2. The system for uninterrupted flow stacking of claim 1, wherein the first mobile bridge transfer conveyor and the second mobile bridge transfer conveyor each comprise a spillage guard.

3. The system for uninterrupted flow stacking of claim 2, further comprising a hydraulic ram for discharge from the mobile telescoping conveyors that extends and retracts a material loading point between the first mobile bridge transfer conveyor and the second mobile bridge transfer conveyor.

4. The system for uninterrupted flow stacking of claim 3, wherein the hydraulic ram is activated by a push button.

5. The system for uninterrupted flow stacking of claim 2, further comprising a hydraulic ram for discharge from the mobile telescoping conveyors that extends and retracts a material loading point between the active mobile bridge transfer conveyor and a mobile telescoping conveyor of the plurality of mobile telescoping conveyors.

6. The system for uninterrupted flow stacking of claim 1, configured for a second bridge transfer maneuver in which the system is changed from the second discharge configuration to the first discharge configuration, the second mobile bridge transfer conveyor is moved to the head end of the new penultimate mobile telescoping conveyor, and the removed mobile telescoping conveyor is positioned in a second cell area.

7. The system for uninterrupted flow stacking of claim 6, wherein the first bridge transfer maneuver and second bridge transfer maneuver are repeated until only a single mobile telescoping conveyor of the plurality of mobile telescoping conveyors remains in the first cell area.

8. The system for uninterrupted flow stacking of claim 7, configured for a cell area transfer maneuver when only a single mobile telescoping conveyor of the plurality of mobile telescoping conveyors remains in the first cell area, wherein the second mobile bridge transfer conveyor is positioned in the second cell area, stacking is completed in the first cell area, and the first mobile bridge transfer conveyor, the mobile bridge conveyor, and the mobile radial stacker are positioned in the second cell area in a configuration to begin uninterrupted stacking in the second cell area.

9. A method for forming cells of bulk material with uninterrupted flow comprising:

locating a system of mobile conveyors along a corridor where the cell is to be created;

transporting material via the mobile conveyor system to a mobile radial stacker conveyor;

feeding the mobile radial stacker conveyor with a mobile bridge conveyor;

diverting flow of the material from a first mobile bridge transfer conveyor positioned at a first end of the mobile bridge conveyor to a second mobile bridge transfer conveyor positioned at a second end of the mobile bridge conveyor such that system material flow is uninterrupted for the duration of the cell creation process;

positioning the first mobile bridge transfer conveyor adjacent to the second mobile bridge transfer conveyor;

removing mobile telescoping conveyors from the system as the mobile stacker conveyor retreats and relocating them to a next cell to be stacked; and diverting flow of the material from the second mobile bride transfer conveyor to the first mobile bridge transfer conveyor as each mobile telescoping conveyor is removed.

10. The method for forming cells of bulk material with uninterrupted flow of claim 9, wherein the system of mobile conveyers comprises a system of mobile telescoping conveyors wherein each conveyor comprises two positions for discharging material flow and is configured to discharge material flow to one of the two positions.

11. The method for forming cells of bulk material with uninterrupted flow of claim 10, wherein the radial stacker conveyor is a telescoping radial stacker conveyor.

12. The method for forming cells of bulk material with uninterrupted flow of claim 11, wherein a quantity of mobile telescoping conveyors is used according to the length of the cell.

13. The method for forming cells of bulk material with uninterrupted flow of claim 11, wherein the steps of the process are repeated to stack a plurality of cells.

14. The method for forming cells of bulk material with uninterrupted flow of claim 11, wherein a cell is used as a substrate for a cell above it.

15. The method for forming cells of bulk material with uninterrupted flow of claim 11, wherein system infeed is provided by a fixed or mobile tripper conveyor.

16. The method for forming cells of bulk material with uninterrupted flow of claim 11, wherein system infeed is provided by another mobile conveying system.

17. A method for uninterrupted flow stacking comprising:

providing a system for uninterrupted flow stacking, comprising:

a cell area;

a mobile radial stacker, a mobile bridge conveyor having a fore load limit area and an aft load limit area, a plurality of mobile telescoping conveyors, each having a head end, a first mobile bridge transfer conveyor having a flow output end, and a second mobile bridge transfer conveyor having a flow output end;

feeding the first mobile bridge transfer conveyer with material transported through the plurality of mobile telescoping conveyors;

feeding the mobile bridge conveyor via the mobile bridge transfer conveyor;

feeding the radial stacker via the mobile bridge conveyor;

depositing the material from the radial stacker in an arc along a centerline of the cell area;

causing the radial stacker to retreat a distance;

repeating the steps of depositing the material and causing the radial stacker to retreat a distance until the fore load limit area of the mobile bridge conveyor is aligned with the flow output end of the first mobile bridge transfer conveyor and the aft load limit area of the mobile bridge conveyor is aligned with the flow output end of the second mobile bridge transfer conveyor;

diverting flow of the material to pass through the second mobile bridge transfer conveyor to the mobile bridge conveyor;

placing the first mobile bridge transfer conveyor in a position adjacent to the second mobile bridge transfer conveyor;

removing a last mobile telescoping conveyor of the plurality of mobile telescoping conveyors;

diverting flow of the material to pass through the first mobile bridge transfer conveyor to the mobile bridge conveyor;

placing the second mobile bridge transfer conveyor at the head end of a penultimate mobile telescoping conveyor of the plurality of mobile telescoping conveyors;

transferring the removed mobile telescoping conveyor to a second cell area; and repeating the steps of feeding the first mobile bridge transfer conveyer, feeding the mobile bridge conveyor, feeding the radial stacker, depositing the material, causing the radial stacker to retreat a distance, repeating the steps of depositing the material and causing the radial stacker to retreat a distance, diverting flow of the material to pass through the second mobile bridge transfer conveyor, placing the first mobile bridge transfer conveyor in a position adjacent to the second mobile bridge transfer conveyor, removing a last mobile telescoping conveyor, diverting flow of the material to pass through the first mobile bridge transfer conveyor, placing the second mobile bridge transfer conveyor at the head end of a penultimate mobile telescoping conveyor, and transferring the removed mobile telescoping conveyor to a second cell area until a cell is completed in the first cell area.

18. The method for uninterrupted flow stacking of claim 17, wherein a quantity of mobile telescoping conveyors is used according to the length of the cell.

19. The method for uninterrupted flow stacking of claim 17, wherein the steps of the process are repeated to stack a plurality of cells.

* * * * *